United States Patent
Yamamoto et al.

(10) Patent No.: US 9,230,704 B2
(45) Date of Patent: Jan. 5, 2016

(54) HARD COAT FILM, AND RADIATION IMAGE CONVERSION PANEL USING THE SAME

(71) Applicant: Konica Minolta, Inc., Tokyo (JP)

(72) Inventors: Yoshito Yamamoto, Higashimurayama (JP); Takafumi Yanagita, Hachioji (JP); Hideki Komatsu, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/451,827

(22) Filed: Aug. 5, 2014

(65) Prior Publication Data

US 2015/0048259 A1   Feb. 19, 2015

(30) Foreign Application Priority Data

Aug. 13, 2013 (JP) .................. 2013-168105

(51) Int. Cl.
| | |
|---|---|
| G01J 1/58 | (2006.01) |
| G21K 4/00 | (2006.01) |
| C09D 133/08 | (2006.01) |
| G01T 1/20 | (2006.01) |
| G02B 1/10 | (2015.01) |
| C08F 2/48 | (2006.01) |
| B32B 27/08 | (2006.01) |
| B05D 3/06 | (2006.01) |
| C08J 7/04 | (2006.01) |
| B29C 35/08 | (2006.01) |

(52) U.S. Cl.
CPC *G21K 4/00* (2013.01); *B05D 3/067* (2013.01); *B32B 27/08* (2013.01); *C08F 2/48* (2013.01); *C08J 7/047* (2013.01); *C09D 133/08* (2013.01); *G01T 1/2012* (2013.01); *G02B 1/105* (2013.01); *B29C 2035/0827* (2013.01); *G21K 2004/10* (2013.01); *Y10T 428/24364* (2015.01); *Y10T 428/31504* (2015.04)

(58) Field of Classification Search
CPC .......... G01K 2004/06; G01K 2004/10; G01T 1/2012; G02B 1/105; C08F 2/48; B32B 27/08; B29C 2035/0827; B05D 3/067; C08J 7/047; Y10T 428/31504; Y10T 428/24364
See application file for complete search history.

(56) References Cited

U.S. PATENT DOCUMENTS

| | | | | |
|---|---|---|---|---|
| 5,925,473 | A | * 7/1999 | Kuriyama et al. | ............. 428/690 |
| 2002/0110692 | A1 | * 8/2002 | Suzuki et al. | ............... 428/411.1 |
| 2011/0250408 | A1 | * 10/2011 | Kasahara et al. | ........... 428/195.1 |

FOREIGN PATENT DOCUMENTS

| | | | |
|---|---|---|---|
| JP | AH8-19000 | | 1/1996 |
| JP | 2001-133598 A | | 5/2001 |
| JP | 2004021183 A | * | 1/2004 |
| JP | 2008119867 A | * | 5/2008 |
| JP | 2010237572 A | * | 10/2010 |
| JP | 2011-190343 A | | 9/2011 |
| JP | 2012252275 A | * | 12/2012 |

\* cited by examiner

*Primary Examiner* — Kiho Kim
(74) *Attorney, Agent, or Firm* — Lucas & Mercanti, LLP

(57) ABSTRACT

A hard coat film includes: a transparent base material; and a hard coat layer formed on the transparent base material, wherein the hard coat layer includes a cured product obtained by curing a composition including: an ultraviolet curable acrylate resin including one or more types of multifunctional acrylate; first microparticles having an average particle diameter of 5 nm or more and 100 nm or less; and a thermoplastic polyester resin.

19 Claims, 3 Drawing Sheets

HARD COAT FILM, AND RADIATION IMAGE CONVERSION PANEL USING THE SAME

The entire disclosure of Japanese Patent Application No. 2013-168105 filed on Aug. 13, 2013 including description, claims, drawings, and abstract are incorporated herein by reference in its entirety.

BACKGROUND OF THE INVENTION

1. Field of the Invention

The present invention relates to a hard coat film used for producing a radiation image conversion panel, and the radiation image conversion panel obtained by using the hard coat film.

2. Description of the Related Art

In recent years, display devices such as a liquid crystal display and a touch panel display have rapidly become widespread. On a surface of such display devices, a film in which a hard coat material is used as a protective layer is disposed. Above all, the liquid crystal display is noticeably getting larger and larger and is used for various purposes. Therefore, the hard coat material used for such a liquid crystal display is expected to have higher hardness, than those used for other displays, and to have smaller film curls during curing. Further, the hard coat material herein is also expected to have higher adhesiveness to a base material.

To solve the above-mentioned problems, for example, JP 2011-190343 A (Kyoeisha Chemical Co., Ltd.) discloses, as a hard coat composition, a composition including (A) a urethane(meth)acrylate resin, (B) a multifunctional (meth)acrylate resin, (C) a (meth)acrylate-containing fluorine compound, and (D) a metal-oxide microparticle. However, there is a case where the above-mentioned hard coat composition does not have sufficient adhesiveness to the base material with respect to a strong repetitive sliding or an impact.

Further, in a digital radiation image detecting device typified by a computed radiography (CR), a flat panel type radiation detector (FPD) and the like, a radiation image conversion panel including a phosphor layer is used. Examples of such a radiation image conversion panel include one that is used for a method in which fluorescence emitted from the phosphor layer is directly detected by a photoelectric conversion element to provide an image. Further, such examples include one that is used for a method in which the phosphor layer accumulates some radiation energy, and is irradiated with excitation light such as visible light. Herein, photostimulated luminescence which occurs in accordance with the accumulated energy is detected to provide an image.

On the other hand, the phosphor-containing phosphor layer is sensitive to mechanical alteration such as damages due to friction, and chemical alteration such as deliquescence due to moisture in the air and the like. Such alteration may easily cause deterioration in the quality of the radiation image.

Accordingly, as a method using the radiation image detecting device, a radiation image conversion panel used with a configuration in which a protective layer is disposed on a phosphor layer has been known. However, in such a radiation image conversion panel in the related art, a surface of the protective layer repetitively comes into contact with a surface of other objects depending on its use. As a result, scratches easily appear on the surface of the protective layer. The scratches herein cause deterioration in the radiation image eventually obtained, or cause deterioration in the quality of image information relating to the radiation image. Therefore, improvement in a damage-proof property of the protective layer has been further demanded.

To solve the above-mentioned problems, for example, JP 8-190000 A (FUJIFILM Corporation) discloses a radiation image conversion panel including a protective layer that includes a transparent base material and a resin composition layer, containing a fluorinated resin, disposed thereon.

However, a coated film including the fluorinated resin disclosed in JP 8-190000 A may not necessarily obtain sufficient hardness. Further, there is a case where the coated film may not obtain sufficient scratch resistance with respect to the repetitive sliding due to minute inorganic materials such as sand. To overcome such weaknesses, JP 2001-133598 A (FUJIFILM Corporation) discloses a protective layer in which a hard coat layer having pencil hardness of 2H or more is applied to a transparent base material. Although the protective layer herein has high scratch resistance, adhesiveness of the hard coat layer to the transparent base material is not sufficient. Therefore, there is a possibility that a phenomenon occurs in which the hard coat layer and the transparent base material come off with respect to the repetitive sliding due to the minute inorganic material such as sand or the impact.

SUMMARY OF THE INVENTION

An object of the present invention is to provide a hard coat film having high hardness, high scratch resistance as well as adhesiveness to a transparent PET base material. A crack is hardly generated at an edge of the hard coat film herein during die cutting. Another object of the present invention is to provide a radiation image conversion panel having a high damage-proof property and a high stain-proof property without causing deterioration in the quality of an image. The radiation image conversion panel herein is capable of enduring repetitive use even in a severe environment.

To achieve at least one of the above-mentioned objects, a first aspect of the present invention includes a hard coat film hereinafter described:

a hard coat film including:
a transparent base material; and
a hard coat layer formed on the transparent base material, wherein the hard coat layer includes a cured product obtained by curing a composition including:
an ultraviolet curable acrylate resin including one or more types of multifunctional acrylate;
first microparticles having an average particle diameter of 5 nm or more and 100 nm or less; and
a thermoplastic polyester resin.

Further, a second aspect of the present invention is a radiation image conversion panel including, while laminating in the order mentioned:
a supporter;
a phosphor layer; and
a protective layer including the hard coat film.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Hereinafter, the present invention will be described in detail. Herein, a term "light" in the present description represents an electromagnetic wave, among electromagnetic waves, having a wavelength region from an ultraviolet region to an infrared region, centering on visible light. More specifically, the "light" represents an electromagnetic wave having a wavelength from 300 nm to 800 nm. Further, terms "phosphor" and "scintillator" herein represent a phosphor which emits the above-mentioned "light" by absorbing incident radioactive energy such as an X-ray. Moreover, a term "transparent" herein represents a property of transmitting the above-mentioned "light" without causing any noticeable reflection or scattering, unless otherwise mentioned.

[Hard Coat Film]

A hard coat film according to an embodiment of the present invention includes a transparent base material and a hard coat layer formed on the transparent base material. The hard coat layer herein includes a cured product obtained by curing a composition that includes an ultraviolet curable acrylate resin including one or more types of multifunctional acrylate, first microparticles having an average particle diameter of 5 nm or more and 100 nm or less, and a thermoplastic polyester resin.

Figure 1:
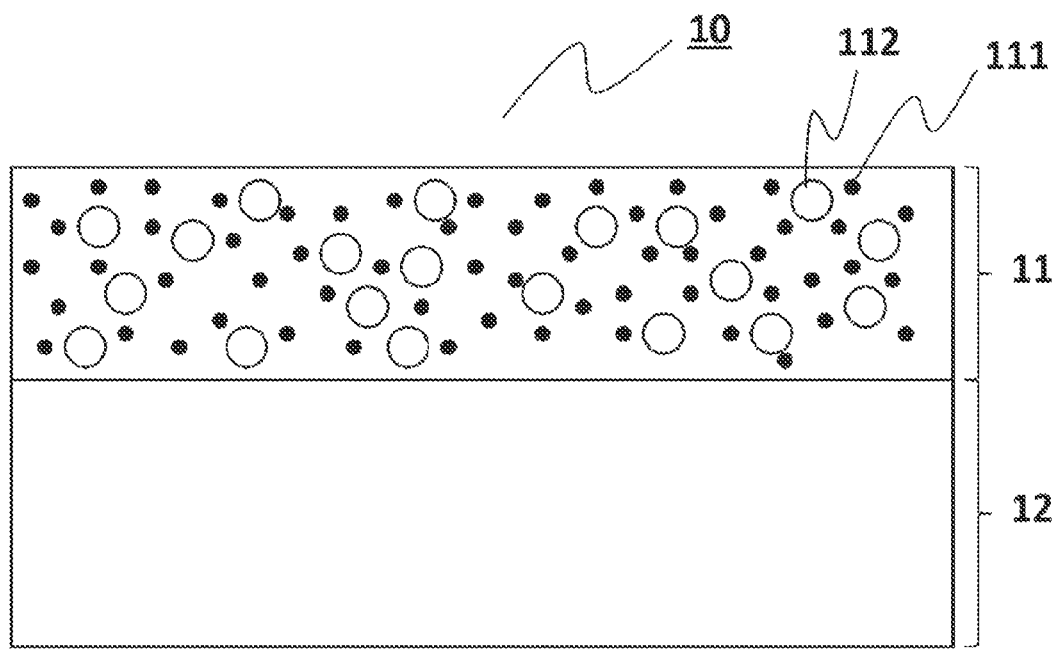
FIG. 1 is a schematic view showing a basic configuration of a hard coat film according to an embodiment of the present invention.

A basic configuration of the hard coat film according to an embodiment of the present invention is shown in FIG. 1. FIG. 1 is an aspect in which a hard coat film 10 includes a hard coat layer 11 and a transparent base material 12, and in which the hard coat layer 11 is disposed on the transparent base material 12. Herein, the hard coat layer 11 and the transparent base material 12 are laminated. This hard coat layer 11 includes the cured product of the composition (hereinafter referred to as "composition for forming the hard coat layer") including the ultraviolet curable acrylate resin that includes one or more types of multifunctional acrylate, first microparticles 111 having an average particle diameter of 5 nm or more and 100 nm or less, and the thermoplastic polyester resin. Therefore, the hard coat layer 11 includes the first microparticles 111. Herein, in a preferable aspect of the present invention, one which further includes second microparticles 112 is used as the "composition for forming the hard coat layer". Herein, the hard coat layer 11 obtained by curing the composition further includes the second microparticles 112. Further, in one aspect of the present invention, one which further includes a fluorine compound is used as the "composition for forming the hard coat layer". Herein, the hard coat layer 11 obtained by curing the composition further includes the fluorine compound.

Figure 2:
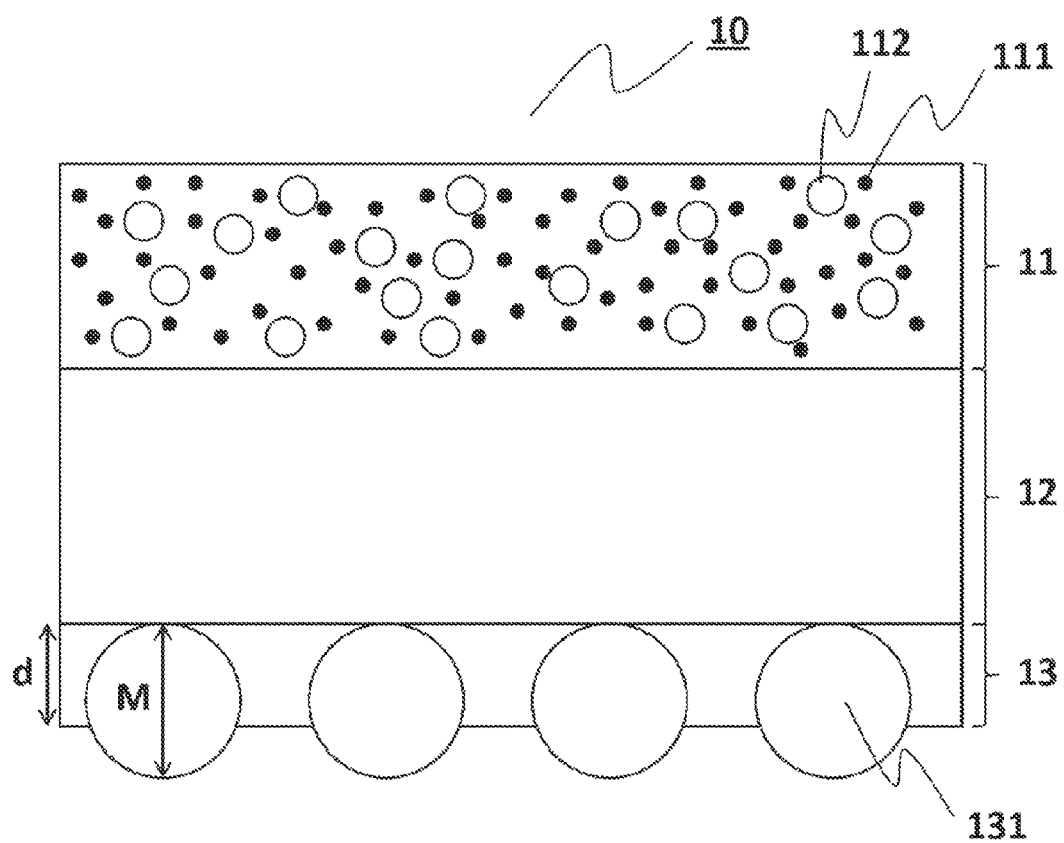
FIG. 2 is a schematic view showing an exemplary hard coat film according to an embodiment of the present invention.

In a further specific aspect, the hard coat film 10 can further include other layers such as an adhesive layer 13 as shown in FIG. 2. Herein, the adhesive layer 13 which may be included in the hard coat film 10 according to an embodiment of the present invention contains matting agent particles 131 having a specific size. The matting agent particles 131 herein are located on a surface, of the transparent base material 12, opposite to the hard coat layer 11. In other words, in cases where the hard coat film 10 according to an embodiment of the present invention further includes the adhesive layer 13, the transparent base material 12 is disposed on the adhesive layer 13, and the hard coat layer 11 is disposed on the transparent base material 12. Hereinafter, each component will be described in sequence.

(Hard Coat Layer)

The hard coat layer 11 used in the present invention includes the cured product obtained by curing the composition (that is, "composition for forming the hard coat layer") including the ultraviolet curable acrylate resin that includes one or more types of the multifunctional acrylate, the first microparticles having an average particle diameter of 5 nm or more and 100 nm or less, and the thermoplastic polyester resin.

In the present invention, the hard coat layer 11 in the hard coat film 10 plays a role of exerting damage resistance. Herein, hardness caused by the hard coat layer 11 used in the present invention is not specifically restricted as long as an radiation image conversion panel can have sufficient damage resistance with respect to a repetitive sliding due to minute inorganic materials and the like such as sand. More specifically, when the hard coat layer 11 is used in the hard coat film 10, it is preferable to make its hardness 3H or more based on a pencil hardness test represented by JIS K5400 (load: 500 g).

In the present invention, the thickness of the hard coat layer 11 is not specifically restricted as long as the hard coat film 10 according to an embodiment of the present invention has the sufficient damage resistance. However, it is preferable that the thickness be 0.5 μm or more from a viewpoint of acquiring the sufficient damage resistance as well as excellent handleability. On the other hand, it is preferable that the thickness of the hard coat layer 11 be 4 μm or less from viewpoints of suppressing coherent unevenness and acquiring constant vividness. Further, in a more preferable aspect of the present invention, the thickness of the hard coat layer 11 is within the range of 2 μm to 3 μm.

Ultraviolet Curable Acrylate Resin

The ultraviolet curable acrylate resin is included in the composition for forming the hard coat layer used for forming the hard coat layer 11 included in the hard coat film 10 according to an embodiment of the present invention. In the present invention, the ultraviolet curable acrylate resin is used to be included in a basic configuration of the hard coat layer 11. The basic configuration of the hard coat layer 11 having the sufficient hardness is obtained based on a cured acrylate resin component which is formed by curing this ultraviolet curable acrylate resin. As the ultraviolet curable acrylate resin, an ultraviolet curable reactive monomer and oligomer can be used.

Herein, a material of the ultraviolet curable acrylate used in the present invention is not specifically restricted. However, by especially using a hard coat material including a multifunctional (meth)acrylate resin and/or a urethane(meth)acrylate resin, it is possible to achieve improvement in scratch resistance based on transparency and density growth of an amorphous resin. Further, it is possible to achieve improvement in adhesiveness based on reaction between a functional group contained in the acrylate resin and a water molecule existing on the transparent base material. Herein, the "(meth) acrylate" in the present description is a concept involving both acrylate and methacrylate.

Preferable examples of the multifunctional (meth)acrylate resin include a compound having two or more (meth)acryloyl groups within one molecule. Such preferable examples include: pentaerythritol(tetra)tri(meth)acrylate, dipentaerythritolhexa(meth)acrylate, dipentaerythritolpenta(meth)acrylate, dimethylol-tricyclodecane di(meth)acrylate, trimethylolpropane (ethylene oxide adduct) tri(meth)acrylate, polyester di(meth)acrylate, tetraethylene glycol di(meth)acrylate, glycerin di(meth)acrylate, (meth)acrylate of glycerin ethylene oxide adduct, and (meth)acrylate of glycerin propylene oxide adduct; diacrylate of polyalkylene glycol such as ethylene glycol, diethylene glycol, triethylene glycol, tetraethylene glycol, propylene glycol, dipropylene glycol, tripropylene glycol, and tetrapropylene glycol; a compound which can be obtained by reaction among (meth)acrylate of a compound obtained by condensing polyalcohol and polybasic acid and the above-mentioned polyisocyanate and hydroxyl group-containing (meth)acrylate; and a compound which can be obtained by urethanization reaction of hydroxyl group-containing polymer and hydroxyl group-containing (meth)acrylate due to isocyanate.

Further, examples of the urethane(meth)acrylate resin may include one that includes one or more hydrophilic groups (for example, hydroxyl groups, carboxy groups, amino groups, amide groups, thiol groups, ethylene glycol groups, and propylene glycol groups). More specifically, such examples include a resin and the like which can be obtained by reaction among a compound in which polyether polyol is a main chain, an isocyanate compound, and a hydroxyl group-containing methacrylate compound. Among these compounds, one type may be used independently or two or more types may be used in combination.

Thermoplastic Polyester Resin

The thermoplastic polyester resin is included in the composition for forming the hard coat layer used for forming the hard coat layer 11 included in the hard coat film 10 according to an embodiment of the present invention. Herein, the hard coat layer 11 includes the cured product obtained by curing the composition for forming the hard coat layer. Therefore, the hard coat layer 11 includes the thermoplastic polyester resin. In the present invention, the thermoplastic polyester resin is used in order to provide the hard coat layer 11 with sufficient adhesiveness to the transparent base material 12. Herein, the thermoplastic polyester resin included in the hard coat layer 11 is not specifically restricted as long as the resin is capable of imparting the sufficient adhesiveness to the hard coat layer 11. However, preferable examples of the thermoplastic polyester resin include a saturated polyester resin, more specifically, a saturated polyester resin in which polyvalent carboxylic acid and polyalcohol are polymerized by an ester bond. Herein, the thermoplastic polyester resin used in the present invention preferably has a glass-transition temperature (Tg) of 40° C. or more. Especially, by using, as the thermoplastic polyester resin, an amorphous polyester resin having a glass-transition temperature of 40° C. or more and 100° C. or less, it is possible to drastically improve the adhesiveness to the transparent base material at room temperature. Examples of such a material include VYLON® (Toyobo Co., Ltd.), ELITEL® (UNITIKA LTD.), Nichigo-POLYESTER® (The Nippon Synthetic Chemical Industry Co., Ltd.), ARAKYD® (Arakawa Chemical Industries, Ltd.), and ESPEL® (Hitachi Chemical Co., Ltd.).

In the present invention, the composition for forming the hard coat layer includes 1 to 50 parts by weight of the thermoplastic polyester resin with respect to 100 parts by weight of the ultraviolet curable acrylate resin. Therefore, when the composition for forming the hard coat layer is included in the hard coat layer 11, it is possible to relieve stress due to cure shrinkage of the ultraviolet curable acrylate resin because of elasticity of the thermoplastic polyester resin. Such stress-relief can be achieved without causing deterioration in a damage-proof property. Further, it is possible to improve adhesiveness because wettability with respect to the transparent base material, especially, a PET film is improved.

First Microparticle

The first microparticles 111 are included in the composition for forming the hard coat layer used for forming the hard coat layer 11 included in the hard coat film 10 according to an embodiment of the present invention. Herein, the hard coat layer 11 includes the cured product obtained by curing the composition for forming the hard coat layer. Therefore, the hard coat layer 11 includes the first microparticles 111. In the present invention, these first microparticles 111 play a role of imparting damage resistance to the hard coat film 10.

Herein, the first microparticles 111 used in the present invention have an average particle diameter of 5 nm or more and 100 nm or less. However, it is preferable that the average particle diameter be 10 nm or more and 30 nm or less. Thanks to such an average particle diameter, it is possible to improve the damage resistance, and also to adjust a refractive index of a coated film. The particle diameter of the first microparticles 111 according to an embodiment of the present invention represents the maximum length of a particle observed by an electron microscope. Herein, the particle diameters of 100 particles arbitrarily selected are measured. The average particle diameter of the microparticles represents an average value of the particle diameters of those particles.

Further, a material of the first microparticles 111 used in the present invention is not specifically restricted as long as the hard coat layer 11 can have the damage resistance. However, a hard particle is preferable from a viewpoint of imparting the sufficient damage resistance. Note that a specifically preferable example includes a metal-oxide microparticle. Examples of the metal-oxide microparticle include silicon oxide, titanium oxide, zirconium oxide, zinc oxide, tin oxide, aluminum oxide, indium oxide, indium tin oxide, cerium oxide, yttrium oxide, manganese oxide, holmium oxide, copper oxide, bismuth oxide, cobalt oxide, tricobalt tetroxide, triiron tetroxide, magnesium oxide, lanthanum oxide, praseodymium oxide, neodymium oxide, samarium oxide, europium oxide, gadolinium oxide, terbium oxide, dysprosium oxide, erbium oxide, thulium oxide, ytterbium oxide, lutetium oxide, scandium oxide, tantalum pentoxide, niobium pentoxide, iridium oxide, rhodium oxide, ruthenium oxide, and complex oxide in which these oxides are bound.

Among these particles, one type may be used independently or two or more types may be used in combination. In the present invention, the composition for forming the hard coat layer includes 40 to 300 parts by weight of such first microparticles 111 with respect to 100 parts by weight of the ultraviolet curable acrylate resin. Therefore, it is possible to improve the damage resistance when the composition for forming the hard coat layer is included in the hard coat layer 11. Further, it is possible to suppress shrinkage of the hard coat layer 11 due to the cure shrinkage of the ultraviolet curable acrylate resin.

Second Microparticle

It is preferable that the composition for forming the hard coat layer used for forming the hard coat layer 11 included in the hard coat film 10 according to an embodiment of the present invention further include the second microparticles 112 having an average particle diameter of 0.3 μm or more and 1 μm or less, in addition to the above-mentioned first microparticles 111. Herein, the hard coat layer 11 includes the cured product which can be obtained by curing the composition for forming the hard coat layer. Therefore, in a preferable aspect of the present invention, the hard coat layer 11 includes the second microparticles 112 in addition to the first microparticles 111. Herein, the second microparticles 112 are different from the first microparticles 111 in the average particle diameter. Since the hard coat layer 11 includes such second microparticles 112 in addition to the first microparticles 111, protrusions and recesses can be imparted to a hard coat surface, and the damage resistance can be improved. At the same time, it is possible to prevent the coherent unevenness, caused by film thickness unevenness of the hard coat layer, by light scattering effect of the second microparticles 112. However, unlike the above-mentioned first microparticles 111 which are added for the purpose of imparting the damage resistance, the second microparticles 112 are rather added in order to prevent the coherent unevenness as a primary purpose.

Note that a definition of the particle diameter of the second microparticles 112 is similar to that of the above-mentioned first microparticles 111. A material of the second microparticles 112 is not specifically restricted as long as the coherent unevenness can be sufficiently prevented. For example, the second microparticles 112 may be organic particles or inorganic particles. However, preferable examples of the second microparticles 112 include melamine.fordehyde particles, silicone particles, nylon particles, polyphenylene sulfide particles, polyamide-imide particles, epoxy particles, acrylic particles, titanium dioxide particles, and calcium carbonate particles. Especially, it is preferable to use the organic particles such as the melamine.fordehyde particles and the acrylic particles from a viewpoint of acquiring constant transparency as well as sufficient dispersibility in the hard coat film 10.

Among these particles, one type may be used independently or two or more types may be used in combination. In cases where the hard coat film 10 according to an embodiment of the present invention includes the above-mentioned second microparticles 112, it is preferable that a compounding amount of the above-mentioned second microparticles 112 in the above-mentioned composition for forming the hard coat layer be 5 to 20 parts by weight with respect to 100 parts by weight of the ultraviolet curable acrylate resin.

Fluorine Compound

In the hard coat film 10 according to an embodiment of the present invention, it is preferable that the composition for forming the hard coat layer used for forming the hard coat layer 11 further include a fluorine compound. Herein, the hard coat layer 11 includes the cured product obtained by curing the composition for forming the hard coat layer. Therefore, in a preferable aspect of the present invention, the hard coat layer 11 further includes the fluorine compound. In cases where the hard coat layer 11 includes the fluorine compound, the hard coat film 10 can have high water repellency. Further, a stain-proof property and the damage resistance of the hard coat film 10 can be improved.

Herein, it should be noted that the fluorine compound which can be used in the present invention is not specifically restricted as long as the fluorine compound is capable of imparting the water repellency to the hard coat layer 11. However, a preferable example of such a fluorine compound in the present invention includes an ultraviolet reactive fluorine compound. Herein, an example of the ultraviolet reactive fluorine compound included in the hard coat layer 11 includes a fluorine compound containing polymerizable groups so as to be surely fixed inside the hard coat layer 11 through reaction with the above-mentioned ultraviolet curable acrylate resin. Specifically, such an example includes a fluorine compound containing ethylenically unsaturated bond. Among such fluorine compounds containing the ethylenically unsaturated bond, especially, a compound containing acrylate groups, methacrylate groups and/or 2-fluoroacrylate groups as the polymerizable groups is preferably used. This is because it is possible to copolymerize with a multifunctional (meth)acrylate compound and to achieve high hardness.

Examples of the fluorine compound containing polymerizable groups which can be used in the present invention include OPTOOL DAC/OPTOOL DAC-HP (manufactured by Daikin Industries, Ltd.), SUA1900L10/SUA1900L6 (manufactured by Shin-Nakamura Chemical Co., Ltd.), UT3971 (manufactured by The Nippon Synthetic Chemical Industry Co., Ltd.), DIFENSA TF3001/DIFENSA TF3000/DIFENSA TF3028 (manufactured by DIC Corporation), LIGHT-PROCOAT AFC3000 (manufactured by Kyoeisha Chemical Co., Ltd.), KNS5300 (manufactured by Shin-Etsu Silicones), and UVHC1105/UVHC8550 (manufactured by GE Toshiba Silicones Co., Ltd.). Herein, the fluorine compound containing 2-fluoroacrylate groups, such as the above-mentioned OPTOOL DAC-HP, can be produced by a method described, for example, in JP 2009-9138 A.

In cases where the hard coat film 10 according to an embodiment of the present invention includes the above-mentioned ultraviolet reactive fluorine compound, it is preferable that a compounding amount of the ultraviolet reactive fluorine compound in the above-mentioned composition for forming the hard coat layer be 0.01 to 2 parts by weight with respect to 100 parts by weight of the ultraviolet curable acrylate resin. Since the composition for forming the hard coat layer includes the ultraviolet reactive fluorine compound at such a rate, it is possible to impart appropriate water repellency to the surface of the hard coat layer 11. Further, it is possible to improve the stain-proof property and the damage resistance.

(Transparent Base Material)

In the present invention, a transparent base material 12 is used for forming a basic skeleton of the hard coat film 10 according to an embodiment of the present invention. The transparent base material which can be used in the present invention is not specifically restricted as long as it is transparent and has appropriate strength. Generally, a transparent film can be used.

In the present invention, preferable examples of the transparent film used as the transparent base material 12 include: an optical film such as polyethylene terephthalate, polymethyl methacrylate (PMMA), polyethylene, polycarbonate, polypropylene, vinyl chloride, polybutylene terephthalate, ABS, AS, POM, polystyrene, polyamide, TEFLON®, an ethylene acid vinyl copolymer, a phenol resin, melamine, polyester, an epoxy resin, cellulose, polyethylene naphthalate (PEN), a cycloolefin polymer (COP), polycarbonate (PC), polymethylmethacrylate (PMMA); and a resin layer such as polyethersulfone (PES), polyimide (PI), cast polypropylene (CPP) or a copolymer of these materials. A preferable aspect of the present invention uses a film of these resins. The thickness of the transparent base material 12 is preferably 1 to 50 μm, more preferably, 4 to 20 μm, from a viewpoint of the vividness and the damage resistance.

(Adhesive Layer)

As mentioned above, the hard coat film 10 according to an embodiment of the present invention includes the above-mentioned hard coat layer 11 and the above-mentioned transparent base material.

Herein, when the hard coat film 10 is used in the radiation image conversion panel, it is preferable that the hard coat film 10 further include the adhesive layer 13 containing matting agent particles 131 of a certain size on the surface, of the transparent base material 12, opposite to the hard coat layer 11 as shown in FIG. 2. This adhesive layer 13 is disposed in order to adhere, as necessary, the hard coat film 10 according to an embodiment of the present invention to a phosphor layer (hereinafter described). The hard coat film 10 is, in other words, a laminated body of the above-mentioned hard coat layer 11 and the above-mentioned transparent base material 12.

Figure 3:
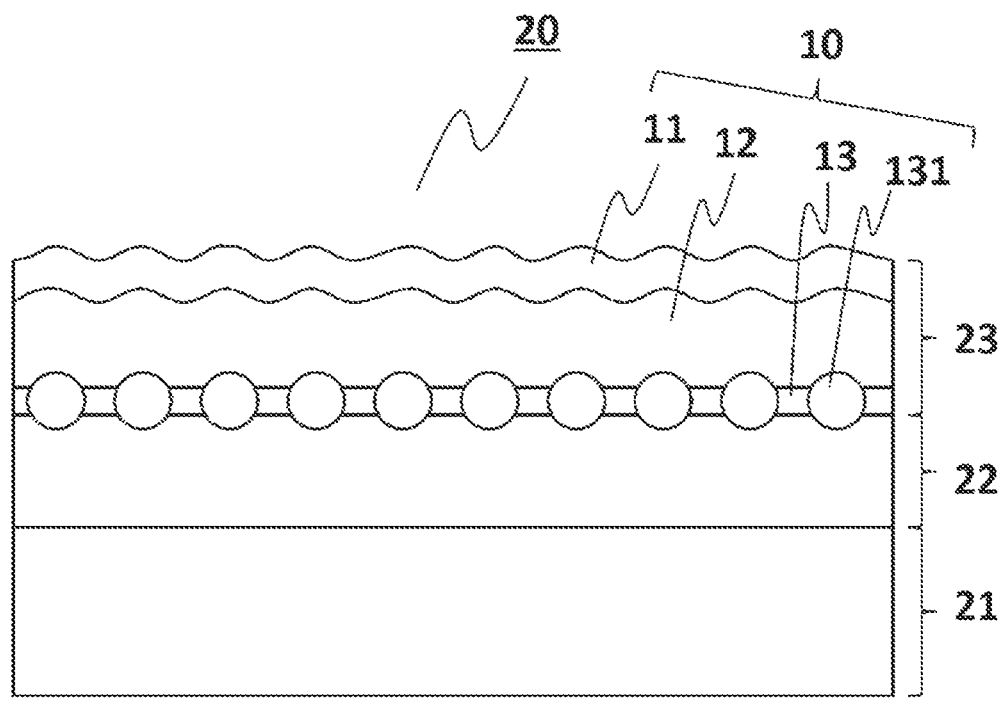
FIG. 3 is a schematic view showing a basic configuration of a radiation image conversion panel according to an embodiment of the present invention.

In a typical aspect, the adhesive layer 13 which can be used in the present invention includes an appropriate adhesive binder resin and the matting agent particles 131 as shown in FIG. 2. Herein, the matting agent particles 131 themselves are mutually connected through the adhesive binder resin. In the present invention, an average particle diameter M of the matting agent particles 131 and a film thickness of the adhesive layer 13, more strictly, a film thickness d of a part, within the adhesive layer 13, where the matting agent particles 131 do not exist satisfy a relation of M>d. Since the adhesive layer 13 used in the present invention satisfies such a relation, when the hard coat film 10 according to an embodiment of the present invention is used as a protective layer 23 of a radiation image conversion panel 20, high adhesiveness can be obtained while the matting agent particles 131 cut into a phosphor layer 22 as shown in FIG. 3. Further, by satisfying such a relation, minute protrusions and recesses are provided on a surface of the protective layer 23. Therefore, a contact area where the radiation image conversion panel 20 comes into contact with other objects can be reduced. As a result, improvement in the damage resistance can be achieved because it is possible to reduce friction caused when the radiation image conversion panel 20 comes into contact with other objects.

Herein, a cross-section of the adhesive layer 13 is observed with the electron microscope, and the thicknesses of 20 points, where the matting agent particles 131 do not exist, are measured. It should be noted that the film thickness d of the adhesive layer 13 in the present description represents an average of the values measured at those points. In other words, in a typical aspect of the present invention, the film thickness d of the adhesive layer 13 represents the film thickness of an adhesive binder resin part included in the adhesive layer 13.

Adhesive Binder Resin Part

A material of the adhesive binder resin included in the adhesive binder resin part of the adhesive layer 13 which may be used in the present invention is not specifically restricted as long as a function of the phosphor layer (hereinafter described) is not deteriorated, and also the transparent base material 12 and the phosphor layer included in the hard coat film 10 can be adhered to each other. However, in a typical aspect, examples of the adhesive binder resin include polyurethane, polyester, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, a cellulose derivative (cellulose nitrate and the like), a styrene-butadiene copolymer, various synthetic rubber resins, a phenol resin, an epoxy resin, a urea resin, a melamine resin, a phenoxy resin, a silicone resin, an acrylic resin, a urea formamide resin. Especially, it is preferable to use polyurethane, polyester, a vinyl chloride copolymer and the like. Among these adhesive binder resins, one type may be used independently or two or more types having different Tg may be mixed.

Matting Agent Particle

In the present invention, an example of the matting agent particles 131 includes generally-used matting agent particles. More specifically, such an example includes a particle having a particle diameter of 100 µm or less. Herein, the particle diameter represents a maximum length of a projection image.

In the present invention, a value of the average particle diameter M of the matting agent particles 131 is larger than that of the film thickness d of the above-mentioned adhesive layer 13. Herein, the particle diameters of 100 particles arbitrarily selected are measured. The average particle diameter M represents an average value of these particle diameters. A shape of the matting agent particles 131 is not specifically restricted. However, a spherical particle is preferably used from a viewpoint of dispersibility and surface control. Further, the average particle diameter is preferably 50 µm or less, more preferably 3 µm or more and 50 µm or less, from a viewpoint of image unevenness. The matting agent particles 131 are larger than the value of the film thickness d of the above-mentioned adhesive layer 13. However, it is preferable that the average particle diameter M satisfy a relation of 3d<M<15d.

Preferable examples of a material of the matting agent particles 131 include a transparent material or one which has a small difference in the refractive index from the above-mentioned adhesive binder resin. For example, inorganic particles such as silica and calcium carbonate, or resin particles such as an acrylic resin are preferable. Especially, the silica particles and the acrylic resin particles are preferable. Among these examples of the matting agent particles 131, one type may be used independently or two or more types may be combined and used.

An amount of the matting agent particles 131 included in the adhesive layer 13 is preferably 0.01% by mass to 20% by mass with respect to the above-mentioned adhesive binder resin. More preferably, it is 1.0% by mass to 5.0% by mass.

Method for Forming Adhesive Layer

The adhesive layer 13 can be formed by preparing application liquid for the adhesive layer containing the above-mentioned adhesive binder resin and the above-mentioned matting agent particles 131, and by applying the application liquid for the adhesive layer to a base material which is an application target.

The application liquid for the adhesive layer preferably contains a solvent capable of dissolving the above-mentioned adhesive binder resin. Preferable examples of the solvent include methyl ethyl ketone, toluene, and cyclohexanone. In the present invention, among these solvents, one type may be used independently. However, a mixed solvent including two or more types of these solvents is preferably used.

In the present invention, in a case of forming the hard coat film 10 including the adhesive layer 13, the adhesive layer 13 can be obtained by applying the application liquid for adhesive layer to the above-mentioned transparent base material 12 by a known method such as a wire bar, a bar coater, a web coater or a gravure coater.

(Method for Producing Hard Coat Film)

A method for producing the hard coat film 10 according to an embodiment of the present invention is not specifically restricted as long as the hard coat film 10 can be configured to include the above-mentioned hard coat layer 11 on the above-mentioned transparent base material 12. In a typical case, the hard coat film 10 can be obtained by forming the above-mentioned hard coat layer 11 on the transparent base material 12.

Herein, an example of the method for producing the hard coat film 10 includes processes in which the above-mentioned ultraviolet curable acrylate resin, the above-mentioned thermoplastic polyester resin, the above-mentioned first microparticles, and an appropriate solvent are mixed to obtain a composition for forming the hard coat layer. Herein, the above-mentioned transparent base material 12 is coated with this composition for forming the hard coat layer, and is dried to form a hard coat precursor film. After that, this hard coat precursor film is irradiated with an ultraviolet ray and is cross-linking polymerized to form the hard coat layer 11. In such a case, when the above-mentioned composition for forming the hard coat layer is prepared, the above-mentioned second microparticles and/or the above-mentioned fluorine compound can be further added as necessary.

Herein, a method known in the related art can be employed as a method for forming the hard coat precursor film in which the base material is coated with the above-mentioned composition for forming the hard coat layer. An example of the method for forming the hard coat precursor film includes one in which the film is coated by the wire bar, the bar coater, the web coater, or the gravure coater. However, the method in the present invention is not restricted thereto. For example, the method may be one that applies spray, or one that forms the hard coat precursor film by adopting a wet-type application method such as a spin coater and a dip method.

Further, in irradiating the hard coat precursor film with an ultraviolet ray, a light source and irradiation amount similar to those used for curing a general curable resin composition can be appropriately adopted.

After forming the above-mentioned hard coat layer 11 on the transparent base material 12, a process for forming the adhesive layer 13 can be further carried out as necessary. Herein, the hard coat film 10 including the adhesive layer 13 can be formed as described in the above-mentioned "method for forming adhesive layer", by preparing the application liquid for the adhesive layer containing the above-mentioned adhesive binder resin and the above-mentioned matting agent particles 131, and by applying this application liquid for the adhesive layer to a surface, of the transparent base material 12, opposite to the hard coat layer 11.

[Radiation Image Conversion Panel]

The radiation image conversion panel according to an embodiment of the present invention is configured by laminating a supporter, a phosphor layer, and a protective layer including the above-mentioned hard coat film, in the order mentioned.

With reference to FIG. 3, the radiation image conversion panel 20 according to an embodiment of the present invention includes a supporter 21, the phosphor layer 22, and the protective layer 23 including the above-mentioned hard coat film 10. Herein, the phosphor layer 22 is disposed on the supporter 21. At the same time, the protective layer 23 is disposed on this phosphor layer 22. On this occasion, the protective layer 23 is disposed on the phosphor layer 22 while a surface where the hard coat layer 11 exists faces upward. Herein, in a preferable aspect of the present invention, one that includes the adhesive layer 13 is used as the hard coat film 10. In such a case, the adhesive layer 13 is disposed between the phosphor layer 22 and the transparent base material 12 included in the hard coat film 10.

Herein, as described in the above-mentioned "adhesive layer", the present invention uses, as the adhesive layer 13, one in which the average particle diameter M of the matting agent particles 131 and the thickness d (that is, thickness of the above-mentioned adhesive binder resin part) of the part where the matting agent particles 131 do not exist satisfy the relation of M>d. Therefore, the matting agent particles 131 cut into the phosphor layer 22, and at the same time, the minute protrusions and recesses are provided on the surface of the protective layer 23. In this manner, the high adhesiveness can be obtained while the matting agent particles 131 cut into the phosphor layer 22. At the same time, the contact area where the radiation image conversion panel 20 comes into contact with other objects can be reduced while the minute protrusions and recesses are provided on the surface of the protective layer 23. As a result, it is possible to reduce the friction caused when the radiation image conversion panel 20 comes into contact with other objects, which in turn improves the damage resistance.

Further, the radiation image conversion panel 20 may further include an under-coating layer (not shown) between the supporter 21 and the phosphor layer 22. Moreover, in the radiation image conversion panel 20, a side surface of the phosphor layer 22 may be coated with a resin in order to protect the phosphor layer 22 from moisture, impact and the like. In such a case, the side surface of the phosphor layer 22 may be coated with a material similar to the above-mentioned hard coat film 10. Alternatively, it may be coated with an appropriate resin different from the above-mentioned hard coat film 10. Examples of the resin, different from the above-mentioned hard coat film 10, which can be used for coating the side surface of the phosphor layer 22 include a polyester resin, a silicone resin, a urethane resin, an epoxy resin, an acrylic resin, and a fluorine resin. Herein, in a case of coating the side surface of the phosphor layer 22, it is possible to improve strength as well as adhesiveness to the hard coat film by using a resin in which a polyisocyanate curing agent is further mixed to the above-mentioned resins. Further, among these resins, one type of the resins may be used independently or two or more types may be mixed and used.

Supporter

The supporter 21 used in the radiation image conversion panel 20 according to an embodiment of the present invention is a plate-shaped body or a film-shaped body, which is capable of supporting the phosphor layer 22.

As the supporter 21, various glass, polymer materials, metals, and the like can be used. For example, plate glass such as quartz, borosilicate glass, and chemically reinforced glass; a ceramic substrate such as sapphire, silicon nitride, and silicon carbide; a semiconductor substrate such as silicon, germanium, gallium arsenide, gallium phosphide, and gallium nitrogen; a plastic film such as an acetylcellulose film, a polyester film, a polyethylene terephthalate (PET) film, a polyamide film, a polyimide film, a triacetate film, a polycarbonate film, and a carbon fiber-reinforced resin sheet; a metallic sheet such as an aluminum sheet, an iron sheet, and a copper sheet; or a metallic sheet including a covering layer of a metal oxide can be used. Especially, the PET film, the aluminum sheet, the carbon fiber-reinforced resin sheet, and the polyimide film are preferably used from a viewpoint of durability and reduction in weight. Further, the thickness of the supporter 21 is preferable within the range of 50 μm to 500 μm from a viewpoint of improvement in the durability and reduction in weight.

Phosphor Layer

The phosphor layer 22 used in the present invention includes a phosphor. Herein, the phosphor included in the phosphor layer 22 is not restricted as long as the phosphor is a substance which is capable of converting an X-ray into light. Examples of the phosphor include: a phosphor represented by $BaSO_4$:Ax recited in JP 48-80487 A; a phosphor represented by $MgSO_4$:Ax recited in JP 48-80488 A; a phosphor represented by $SrSO_4$:Ax recited in JP 48-80489 A; a phosphor in which at least one of Mn, Dy, and Tb is added to $Na_2SO_4$, $CaSO_4$, $BaSO_4$ and the like recited in JP 51-29889 A; a phosphor such as BeO, LiF, $MgSO_4$, and $CaF_2$ recited in JP 52-30487 A; a phosphor such as $Li_2B_4O_7$:Cu and Ag recited in JP 53-39277 A; a phosphor such as $Li_2O.(Be_2O_2)_x$:Cu and Ag recited in JP 54-47883 A; and a phosphor represented by SrS:Ce,Sm, SrS:Eu,Sm, $La_2O_2S$:Eu,Sm, and (Zn, Cd)S:Mnx recited in U.S. Pat. No. 3,859,527. Further, such examples include: ZnS:Cu,Pb phosphor recited in JP 55-12142 A; a barium aluminate phosphor whose Formula is represented by $BaO.xAl_2O_3$:Eu; and an alkaline-earth metal silicate phosphor whose Formula is represented by $M(II)O.xSiO_2$:A.

Further, such examples include: an alkaline-earth halogenated fluoride phosphor whose Formula is represented by $(Ba_{1-x-y}Mg_xCa_y)F_x$:$Eu^{2+}$ recited in JP 55-12143 A; a phosphor whose Formula is represented by LnOX:xA recited in JP 55-12144 A; a phosphor whose Formula is represented by $(Ba_{1-x}M(II)_x)F_x$:yA recited in JP 55-12145 A; a phosphor whose Formula is represented by BaFX:$Eu^{2+}$ (X represents at least one type of atoms selected from the group consisting of an iodine atom, a bromine atom, and a chlorine atom) recited in JP 2001-13299 A and the like; a phosphor whose Formula is represented by BaFX:xCe,yA recited in JP 55-84389 A; a rare-earth element activated bivalent metal fluoro halide phosphor whose Formula is represented by M(II)FX.xA:yLn and a phosphor whose Formula is represented by ZnS:A, CdS:A, (Zn, Cd)S:A,X recited in JP 55-160078 A; a phosphor represented by either Formula $xM_3(PO_4)_2.NX_2$:yA or $xM_3(PO_4)_2$:yA recited in JP 59-38278; a phosphor represented by either Formula $nReX_3.mAX'_2$:xEu or $nReX_3.mAX'_2$:xEu, ySm recited in JP 59-155487 A; an alkali halide phosphor represented by Formula $M(I)X.aM(II)X'_2.bM(III)X''_3$:cA recited in JP 61-72087 A; and a bismuth activated alkali halide phosphor represented by Formula M(I)X:xBi recited in JP 61-228400 A. Specifically, the alkali halide phosphor is preferable because it easily forms a pillar-shaped photostimulable phosphor layer by a method such as vapor deposition and sputtering.

Further, a photostimulable phosphor particle represented by the following Formula (1) can be preferably used as well.

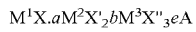

$M^1X.aM^2X'_2bM^3X''_3eA$   Formula (1):

In Formula (1), $M^1$ represents at least one type of alkali metals selected from the group consisting of Li, Na, K, Rb, and Cs. $M^2$ represents at least one type of bivalent metals selected from the group consisting of Be, Mg, Ca, Sr, Ba, Zn, Cd, Cu, and Ni. $M^3$ represents at least one type of trivalent metals selected from the group consisting of Sc, Y, La, Ce, Pr, Nd, Pm, Sm, Eu, Gd, Tb, Dy, Ho, Er, Tm, Yb, Lu, Al, Ga, and In. X, X' and X'' each represent at least one type of halogens selected from the group consisting of F, Cl, Br, and I. A represents at least one type of metals selected from the group consisting of Eu, Tb, In, Cs, Ce, Tm, Dy, Pr, Ho, Nd, Yb, Er, Gd, Lu, Sm, Y, Tl, Na, Ag, Cu, and Mg. a, b, and e respectively represent numerical values within the ranges of $0 \le a < 0.5$, $0 \le b < 0.5$, and $0 < e \le 0.2$. Moreover, in the Formula (1), it is preferable that $M^1$ represent at least one type of alkali metals selected from the group consisting of K, Rb, and Cs. Herein, it is preferable that X represent at least one type of halogens selected from the group consisting of Br and I. Further, it is preferable that $M^2$ represent at least one type of bivalent metals selected from the group consisting of Be, Mg, Ca, Sr, and Ba. Further, it is preferable that $M^3$ represent at least one type of trivalent metals selected from the group consisting of Y, Ce, Sm, Eu, Al, La, Gd, Lu, Ga, and In. Still further, it is preferable that b represent a numerical value within the range of $0 \le b \le 10^{-2}$. Finally, it is preferable that A represent at least one type of metals selected from the group consisting of Eu, Cs, Sm, Tl, and Na.

Such a phosphor can be obtained by a known method. For example, a phosphor represented by BaFX:$Eu^{2+}$ (X represents at least one type of atoms selected from the group consisting of an iodine atom, a bromine atom, and a chlorine atom) can be obtained by the method recited in JP 2001-13299 A or by a modification of the same. Further, other phosphors can be appropriately obtained by the method recited in each of the above-mentioned Patent Literature, or by well-known technology.

The phosphor layer 22 can be formed by a method of applying application liquid containing the above-mentioned phosphor to the above-mentioned supporter 21 by a known method, and drying the supporter 21. Alternatively, the phosphor layer 22 can be formed by a method of providing the above-mentioned phosphor on the above-mentioned supporter 21 by a known vapor deposition method. Herein, a phosphor substrate or a phosphor sheet including the above-mentioned supporter 21 and the phosphor layer 22 is provided.

Under-Coating Layer

The under-coating layer may be further disposed between the above-mentioned supporter 21 and the phosphor layer 22. Herein, an example of a material of the under-coating layer may include one similar to that included in an under-coating layer of a radiation image conversion panel known in the related art. In a general aspect, the under-coating layer includes a polymer resin, more preferably, includes a polymer resin capable of cross-linkage by using a cross-linking agent, and the cross-linking agent.

Examples of a method for forming this under-coating layer include a method of forming a poly-para-xylylene film by a chemical vapor deposition (CVD) method, and a method of applying a polymeric binder (binder). From a viewpoint of excellent coating, the method of applying the polymeric binder (binder) is preferable. In such a case, it is preferable to form the under-coating layer by preparing the polymeric binder (hereinafter also referred to as a "binder") which is dissolved or dispersed in a solvent. Herein, the binder is prepared as a resin dissolution product by dissolving or dispersing in another solvent. Then, the resin dissolution product is applied to the under-coating layer and dried. Herein, the resin dissolution product may further contain the cross-linking agent. As necessary, it may further contain pigment or dye.

Specific examples of the polymeric binder include polyurethane, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, polyester, a cellulose derivative (cellulose nitrate and the like), a styrene-butadiene copolymer, various synthetic rubber resins, a phenol resin, an epoxy resin, a urea resin, a melamine resin, a phenoxy resin, a silicone resin, an acrylic resin, and a urea formamide resin. Especially, it is preferable to use polyurethane, polyester, a vinyl chloride copolymer, polyvinyl butyral, and cellulose nitrate. As the polymeric binder, it is specifically preferable to use polyurethan, polyester, a vinyl chloride copolymer, polyvinyl butyral, and cellulose nitrate from a viewpoint of adhesion to the phosphor layer. Further, it is preferable that the polymeric binder be a polymer having a glass-transition temperature (Tg) of 30 to 100° C. from a viewpoint of coating a vapor-deposited crystal and the supporter. From this viewpoint, it is specifically preferable to use the polyester resin.

Further, it is preferable that the under-coating layer used in the present invention further include the cross-linking agent in addition to the above-mentioned polymeric binder used as the polymer resin. The cross-linking agent which can be used for preparing the under-coating layer is not specifically restricted. For example, multifunctional isocyanate and a derivative thereof, melamine and a derivative thereof, and an amino resin and a derivative thereof can be used. As the cross-linking agent, it is preferable to use a multifunctional isocyanate compound, for example, COLONATE HX, COLONATE 3041 and the like (manufactured by Nippon Polyurethane Industry Co., Ltd.).

Examples of a solvent which can be used for preparing the under-coating layer include: lower alcohol such as methanol, ethanol, n-propanol, and n-butanol; a chlorine atom-containing hydrocarbon such as methylene chloride and ethylene chloride; ketone such as acetone, methyl ethyl ketone, and methyl isobutyl ketone; an aromatic compound such as toluene, benzene, cyclohexane, cyclohexanone, and xylene; ester of a lower fatty acid and the lower alcohol such as methyl acetate, ethyl acetate, and butyl acetate; ether such as dioxane, ethylene glycol monoethyl ether, and ethylene glycol monomethyl ether; and a mixture of the above-mentioned compounds.

Note that, in the present invention, a commercially available resin dissolution product may be used, as it is, as the above-mentioned resin dissolution product. Alternatively, a mixture obtained by combining, with the commercially available resin dissolution product, at least one of a cross-linking agent, pigment, dye, and an additive solvent may be used.

Further, the under-coating layer may include pigment or dye in order to prevent light scattering and improve vividness and the like, when the phosphor (scintillator) emits light.

As such pigment, pigment known in the related art can be used as well. However, preferable pigment used in the present invention is one that absorbs a red long-wave light component which easily scatters light. For example, blue colorant is preferable. A preferable example of such blue colorant includes ultramarine blue, and prussian blue (ferric ferrocyanide). Further, as organic blue pigment, phthalocyanine, anthraquinone, indigoid, carbonium and the like can be used. Among the above-mentioned pigment, the phthalocyanine is preferable from viewpoints of radiation durability, ultraviolet durability and the like of a light-absorbing pigment layer. Note that the "phthalocyanine" herein is a concept involving copper phthalocyanine used in Examples hereinafter described. The dry film thickness of the under-coating layer is preferably 1 to 50 µm, more preferably, 5 to 30 µm.

Method for Producing Radiation Image Conversion Panel

A method for producing the radiation image conversion panel 20 according to an embodiment of the present invention is not specifically restricted as long as an object of the present invention can be achieved. The radiation image conversion panel 20 can be basically obtained by a method similar to one that produces a radiation image conversion panel known in the related art, except that the above-mentioned hard coat film 10 is adopted as the above-mentioned protective layer 23.

More specifically, the under-coating layer is formed on the plate-shaped body or the film-shaped body included in the supporter 21 in accordance with a method known in the related art, as necessary. Then, the above-mentioned phosphor layer 22 is formed to obtain a phosphor substrate or a phosphor sheet (hereinafter referred to as "phosphor sheet and the like"). After that, the above-mentioned hard coat film 10 is affixed to this phosphor sheet and the like. As a result, the radiation image conversion panel 20 can be obtained. Herein, in affixing the above-mentioned hard coat film 10, a unit known in the related art, such as a laminator which is generally employed for affixing sheets, can be used.

Herein, the adhesive layer 13 is usually used in the present invention in order to affix the above-mentioned hard coat film 10 to the phosphor sheet and the like. However, the adhesive layer 13 is not necessarily incorporated into the above-mentioned hard coat film 10 in advance. For example, as the hard coat film 10, one that does not include the adhesive layer 13 may be obtained. At the same time, the adhesive layer 13 may be formed by applying the application liquid for the adhesive layer, mentioned in the "method for forming adhesive layer", to the above-mentioned phosphor layer 22 included in the above-mentioned "phosphor sheet and the like". Then, the radiation image conversion panel 20 may be obtained by affixing this hard coat film 10 to the adhesive layer 13. However, it is preferable to obtain the radiation image conversion panel 20 by preparing the hard coat film 10 including the adhesive layer 13, and by affixing this hard coat film 10 to the above-mentioned phosphor layer 22 included in the above-mentioned "phosphor sheet and the like". This is because it may be possible to effectively exert the effects of improvement in the adhesiveness and the damage resistance. Note that the adhesiveness herein can be obtained while the matting agent particles 131 cut into the phosphor layer 22, and the damage resistance herein can be obtained while the protrusions and recesses, caused by the matting agent particles 131, are provided on the surface of the protective layer 23.

Further, a method for obtaining the radiation image conversion panel 20, in which the side surface of the phosphor layer 22 is coated with a resin, is not specifically restricted. However, in the present invention, by affixing the hard coat film 10, having an appropriate area a size larger than the above-mentioned phosphor layer 22, to the above-mentioned phosphor layer 22, the side surface of the phosphor layer 22 can be coated at the same time. On the other hand, in cases where the side surface of the phosphor layer 22 is coated with an appropriate resin different from that of the hard coat film 10, the side surface of the phosphor layer 22 can be coated by a method known in the related art such as the dip method, a roll coat method, an ink-jet method, a spray method, and a dispenser method.

Use

The radiation image conversion panel according to an embodiment of the present invention can be adopted to x-ray image photographing systems in various aspects. Examples of specifically preferable use thereof include a radiation image conversion panel for a CR and a scintillator panel. Such examples can be used as a radiation image detector by being combined with a known photoelectric conversion element panel.

EXAMPLES

Hereinafter, the present invention will be described in detail with reference to Examples. However, it should be noted that the present invention is not restricted thereto. Note that a phrase "effective component content" in the present Examples represents content of a certain component X in a composition Y when the certain component X is used in an embodiment of the composition Y that is diluted by a solvent. There is a case where the "effective component content" is described as "concentration" in Tables 1-1 to 1-5. Further, a phrase "effective amount" represents an amount which is determined by converting an amount used of this composition Y and the above-mentioned "effective component content" into an amount used of the certain component X.

Example 1

Production of Hard Coat Coating

As a hard coat coating, to 13 g of an ultraviolet curable acrylate resin (UNIDIC 17-824-9: effective component content 77%, manufactured by DIC Corporation), added were 1 g of a thermoplastic polyester resin (VYLON® 200: Tg 67° C., manufactured by Toyobo Co., Ltd.); 75 g of ORGANO- SILICASOL (PL-2L-MEK: particle diameter 20 nm, effective component content 20% (dispersion medium: methyl ethyl ketone), Fuso Chemical Co., Ltd.); 4 g of a melamine. fordehyde particle (EPOSTAR S6: particle diameter 0.3 to 0.6 μm, powder, Nippon Shokubai Co., Ltd.); 0.1 g of a fluorine compound (OPTOOL DAC-HP: effective component content 20%, DAIKIN); and 12 g of methyl ethyl ketone. Then the mixture was evenly dispersed within solution with a propeller mixer to prepare a hard coat coating having an effective component content of about 25%.

(Production of Hard Coat Film)

As a transparent base material, 9 μm of a PET film ("ES510", manufactured by Toyobo Co., Ltd.) was used. The hard coat coating prepared in the above-mentioned way was applied on this PET film with a gravure coater, and the film was dried at 80° C. for about three minutes. After that, the applied film was loaded on a conveyor having velocity of 5 m/min, and was irradiated with an ultraviolet ray from a height of 9 cm with a metal-halide lamp having 100 W/cm. Then, the film was cross-linking polymerized to form a hard coat layer having a thickness of about 2 μm. As a result, the hard coat film was obtained.

(Production of Adhesive Agent Containing Matting Agent)

Two types of polyester resin dissolution products (VYLON® 500 and VYLON® 200, both of them manufactured by Toyobo Co., Ltd.) were prepared at a rate where a resin weight ratio became 1:1. With respect to the obtained mixture, a mixed solvent which was prepared at a rate of toluene: methyl ethyl ketone=1:1 (a mass ratio), was added so that a total sum of effective component content of these resins became 15% by mass. Then, the resultant mixture was stirred with the propeller mixer to obtain a resin dissolution product diluting mixture. Acrylic particles (matting agent) (CHEMISNOW MX series: particle diameter 15 μm, manufactured by Soken Chemical & Engineering Co., Ltd.) were added to the above-mentioned resin dissolution product diluting mixture at a resin ratio of 2% by weight. Then, the mixture was further stirred with a propeller mixer and evenly dispersed within solution to prepare an adhesive agent containing the matting agent.

(Production of Hard Coat Film with Adhesive Layer)

The adhesive agent containing the matting agent prepared in the above-mentioned way was applied to a surface, of the PET film included in the hard coat film produced in the above-mentioned way, opposite to a surface where the hard coat layer exited. The application was carried out at a line speed of 10 m/min with the gravure coater. Then, the surface was dried at 80° C. for about three minutes. After that, an adhesive layer having a dry film thickness of about 2 μm was provided to obtain a hard coat film with the adhesive layer.

(Production of Supporter: Production of Under-Coating Layer)

As a supporter, a white PET film (LUMIRROR® E20: Toray Industries, Inc.) having a thickness of 250 μm was prepared. Note that this white PET film may be referred to as "PET supporter" in the present Examples.

Further, 0.03 g of a β-copper phthalocyanine dispersion product (effective component content 35%, pigment content 30%) and 9.68 g of a curing agent COLONATE HX (Nippon Polyurethane Industry Co., Ltd.) were added to 290.31 g of a polyester resin dissolution product (VYLON® 30SS: effective component content 30%, manufactured by Toyobo Co., Ltd.). Then the resultant mixture was dispersed by a propeller mixer to prepare the under-coating layer application liquid. This under-coating layer application liquid was applied to the above-mentioned white PET film, and the film was dried at 100° C. for five minutes to form an under-coating layer having a thickness of 20 μm.

(Production of Phosphor Sheet)

In order to synthesize a phosphor precursor of europium activated fluorinated iodinated barium, 2500 ml of $BaI_2$ solution (4.0 mol/L) and 125 ml of $EuBr_3$ solution (0.2 mol/L) were put into a reactor. A reaction mother liquor within this reactor was stirred and kept warm at 70° C. By using a roller pump, 250 ml of ammonium fluoride solution (8 mol/L) was injected to the reaction mother liquor to generate a precipitate. Even after injection, heating and stirring were continued for two hours to age the precipitate.

Next, after filtration of the precipitate and after washing the same with ethanol, the precipitate was vacuum-dried to obtain a crystal of the europium activated fluorinated iodinated barium. In order to prevent a change in a particle shape due to sinter during burning, and a change in particle size distribution due to cohesion between particles, 0.1% by mass of ultrafine particle powder of alumina was added. The mixture was sufficiently stirred with a mixer to evenly adhere the ultrafine particle powder of alumina to a surface of the crystal.

The resultant object was filled in a quartz boat and was burned at 850° C. for two hours under a nitrogen gas atmosphere including a small amount (1%) of hydrogen gas by using a tube furnace. Then, phosphor particles of the europium activated fluorinated iodinated barium were obtained.

Next, the above-mentioned phosphor particles were classified to obtain particles having an average particle diameter of 3 μm. To a mixed solvent of methyl ethyl ketone, toluene, and cyclohexanone, 427 g of the phosphor particles of the europium activated fluorinated iodinated barium obtained in the above-mentioned way, as a phosphor layer forming material, and 18 g of a polyester resin (VYLON® 530 manufactured by Toyobo Co., Ltd.) were added. The resultant mixture was dispersed with the propeller mixer and application liquid having effective component content of 77% by mass was prepared.

This application liquid was applied to the above-mentioned under-coating layer formed on the above-mentioned PET supporter by using a doctor blade. After that, the layer was dried at 100° C. for fifteen minutes. A phosphor layer having a thickness of 280 μm was formed on each of them to produce a phosphor sheet.

(Adherence of Phosphor Sheet to Protective Layer)

The hard coat film with adhesive agent produced in the above-mentioned way was adhered to the above-mentioned phosphor sheet by using a laminator. Adherence was carried out at a line speed of 4.0 m/min, at a nip temperature of 120° C. of the laminator, and at a nip linear pressure of 37 kg/cm. A laminate as well as the shape of the acrylic particle were provided on a surface of the protective layer to produce a sample (radiation image conversion panel) with protrusions and recesses imparted on the surface of the phosphor sheet.

Examples 2 to 13

Comparative Examples 1 to 3

In the above-mentioned "production of hard coat coating", samples in Examples 2 to 13 and Comparative Examples 1 to 3 were produced in a similar way and conditions to Example 1, except that an amount and the glass-transition temperature of the thermoplastic polyester resin mixed in the hard coat coating, and a particle diameter and an amount of the first microparticle were changed as shown in Tables 1-1 to 1-5.

Herein, in Examples 2 to 5 and Comparative Example 1, samples were produced while changing the particle diameter of the first microparticle. Herein, instead of the above-mentioned ORGANOSILICASOL (PL-2L-MEK), SNOWTEX ST-XS (aqueous silica sol, manufactured by Nissan Chemical Industries, Ltd.), PL-1-IPA (dispersion medium: isopropanol, manufactured by Fuso Chemical Co., Ltd.), ORGANOSILICASOL L-type (dispersion medium: methyl ethyl ketone) and ORGANOSILICASOL ZL-type (dispersion medium: methyl ethyl ketone) (both of them manufactured by Nissan Chemical Industries, Ltd.), and SNOWTEX MP-2040 (aqueous silica sol, manufactured by Nissan Chemical Industries, Ltd.) were used as the first microparticle.

In Examples 6, 7 and Comparative Example 2, samples were produced while changing the amount of the thermoplastic polyester resin. In Examples 8, 9 and Comparative Example 3, samples were produced while changing the amount of the first microparticle.

In Examples 10, 11, 12, samples were produced in a similar way to Example 1 except that VYLON® GK360 (Tg 56° C., manufactured by Toyobo Co., Ltd.), Nichigo-POLYESTER® TP220 (Tg 70° C., manufactured by The Nippon Synthetic Chemical Industry Co., Ltd.) and Nichigo-POLYESTER® LP035 (Tg 20° C., manufactured by The Nippon Synthetic Chemical Industry Co., Ltd.) were respectively used in those Examples, instead of VYLON® 200.

Further, in Example 13, a sample was produced in a similar way to Example 1, except that the second microparticle and the fluorine compound were not contained.

[Physical Properties Evaluation Regarding Each Example and Each Comparative Example]

Regarding each sample (radiation image conversion panel) obtained in Examples 1 to 13 and Comparative Examples 1 to 3, evaluation for physical properties was carried out as follows. Evaluation results are shown in Tables 1-1 to 1-5.

<Evaluation Items>

(Damage Resistance)

Damage resistance was evaluated by carrying out a steel wool rubbing test with respect to the hard coat layer on the film. The steel wool rubbing test was carried out by rubbing the obtained hard coat layer to and fro for 500 times with a steel wool (#0000) on which load of about 500 g/cm² had been placed.

The damage resistance was determined when each sample tested by the steel wool rubbing test was visually observed. Those seeming to have no damage were evaluated as ○, those seeming to have a few damages were evaluated as Δ, and those seeming to have apparent damages were evaluated as x.

(Pencil Hardness)

Pencil hardness of the hard coat layer on the film was tested based on JIS K5600-5-4, with load of 500 g. Then, the pencil hardness which yielded no damage was determined.

(Adhesiveness)

Adhesiveness was evaluated by carrying out a cross-cut adhesion test relating to the hard coat layer on the film. A hundred cells were prepared with respect to the hard coat layer on the film based on JIS K5400. Then, the hard coat layer was stuck with cellophane tape so as to cover those cells, and then unstuck with the tape. After that, the cross-cut adhesion test was carried out by visually observing the hard coat layer. Herein, those in which none of the 100 cells (100/100) came off were evaluated as ○, those in which 60 cells or more and less than 100 cells among the 100 cells (60/100 to 99/100) did not come off were evaluated as Δ, and those in which less than 60 cells among the 100 cells (less than 60/100) did not come off were evaluated as x.

(Stain-Proof Property)

A line was drawn on the hard coat layer on the film with an oily marking pen (MACKY (black): manufactured by Zebra Co., Ltd.). In wiping off the line with a dried cloth, the number of times of wiping required until the ink line became invisible, was calculated to evaluate a stain-proof property. Samples which required less than 10 times of wiping to remove stains were evaluated as ○. Samples which required 10 times or more and less than 20 times of wiping to remove stains were evaluated as Δ. Samples which required 20 times or more of wiping to remove stains were evaluated as x. Herein, such a sample that could not completely remove stains even after wiping for 20 times was regarded as "a sample which required 20 times or more of wiping to remove stains".

(Unevenness)

Unevenness of the hard coat film was visually evaluated. Those which had no glaze unevenness or whitening were evaluated as ○. Those which partially had glaze unevenness and whitening were evaluated as Δ. Those which thoroughly had glaze unevenness and whitening were evaluated as x.

(Conveyance Durability)

Regarding conveyance durability, first, the radiation image conversion panel produced in the above-mentioned way was cut into a rectangular shape of 150 mm×300 mm, to produce a test piece. Next, sand having an average particle diameter of 30 μm was sprinkled on this test piece. The test piece was introduced into a conveyance system model in which a conveyance system of a commercially available radiation image conversion device had been downsized. Then, the test piece was transferred between a guide plate and a nip roll. After that, the side of the protective layer was forcibly bent, and the test piece was again transferred between the guide plate and the nip roll to return to an original position. This is one cycle of the conveyance, and was repetitively carried out for 3000 times.

After this repetitive conveyance operation, exfoliation of the hard coat layer was visually confirmed. Those which had no exfoliation were evaluated as ○, those which partially had exfoliation were evaluated as Δ, and those which had plenty of exfoliation were evaluated as x. Further, regarding damages after conveyance, the test piece was irradiated with an X-ray, and was excited by a laser to read image data. Those seeming to have no damage on the image data were evaluated as ○, those seeming to have a few damages were evaluated as Δ, and those seeming to have a number of apparent damages were evaluated as x.

TABLE 1-1

|  |  |  |  | Example 1 | Example 2 | Example 3 | Example 4 | Example 5 | Comparative Example 1 |
|---|---|---|---|---|---|---|---|---|---|
| Hard Coat Coating | Ultraviolet Curable Acrylate Resin | Type | | UNIDIC 17-824-9 | UNIDIC 17-824-9 | UNIDIC 17-824-9 | UNIDIC 17-824-9 | UNIDIC 17-824-9 | UNIDIC 17-824-9 |
| | | Amount (g) | | 13 | 13 | 13 | 13 | 13 | 13 |
| | | Concentration (%) | | 77 | 77 | 77 | 77 | 77 | 77 |
| | | Effective Amount | | 10 | 10 | 10 | 10 | 10 | 10 |

TABLE 1-1-continued

|  |  |  | Example 1 | Example 2 | Example 3 | Example 4 | Example 5 | Comparative Example 1 |
|---|---|---|---|---|---|---|---|---|
|  | Thermoplastic Polyester Resin | Type | VYLON 200 | VYLON 200 | VYLON 200 | VYLON 200 | VYLON 200 | VYLON 200 |
|  |  | Tg (C. °) | 67 | 67 | 67 | 67 | 67 | 67 |
|  |  | Amount (g) | 1 | 1 | 1 | 1 | 1 | 1 |
|  | First Microparticle | Type | PL-2L-MEK | ST-XS | PL-1-IPA | L-type | ZL-type | MP2040 |
|  |  | Particle Diameter (nm) | 20 | 5 | 10 | 50 | 100 | 200 |
|  |  | Amount (g) | 75 | 75 | 120 | 50 | 50 | 37.5 |
|  |  | Concentration (%) | 20 | 20 | 12.5 | 30 | 30 | 40 |
|  |  | Effective Amount | 15 | 15 | 15 | 15 | 15 | 15 |
|  | Second Microparticle | Type | EPOSTAR S6 | EPOSTAR S6 | EPOSTAR S6 | EPOSTAR S6 | EPOSTAR S6 | EPOSTAR S6 |
|  |  | Particle Diameter (μm) | 0.3-0.6 | 0.3-0.6 | 0.3-0.6 | 0.3-0.6 | 0.3-0.6 | 0.3-0.6 |
|  |  | Amount (g) | 0.3 | 0.3 | 0.3 | 0.3 | 0.3 | 0.3 |
|  | Fluorine Compound | Type | OPTOOL | OPTOOL | OPTOOL | OPTOOL | OPTOOL | OPTOOL |
|  |  | Amount (g) | 0.1 | 0.1 | 0.1 | 0.1 | 0.1 | 0.1 |
|  |  | Concentration (%) | 20 | 20 | 20 | 20 | 20 | 20 |
|  |  | Effective Amount | 0.02 | 0.02 | 0.02 | 0.02 | 0.02 | 0.02 |
|  | Solvent | Type | Methyl Ethyl Ketone | Methyl Ethyl Ketone | Methyl Ethyl Ketone | Methyl Ethyl Ketone | Methyl Ethyl Ketone | Methyl Ethyl Ketone |
|  |  | Amount (g) | 12 | 9.5 | 0 | 37 | 37 | 50 |
| Physical Properties Evaluation | Damage Resistance |  | ○ | Δ | ○ | ○ | ○ | Δ |
|  | Pencil Hardness |  | 4H | 3H | 4H | 4H | 4H | 3H |
|  | Adhesiveness |  | ○ | ○ | ○ | ○ | ○ | x |
|  | Stain-Proof Property |  | ○ | ○ | ○ | ○ | ○ | ○ |
|  | Transparency (unevenness) |  | ○ | ○ | ○ | ○ | ○ | ○ |
|  | Conveyance | Adhesiveness | ○ | ○ | ○ | ○ | ○ | Δ |
|  | Durability | Damage Resistance | ○ | Δ | ○ | ○ | ○ | Δ |

TABLE 1-2

|  |  |  | Example 6 | Example 7 | Comparative Example 2 |
|---|---|---|---|---|---|
| Hard Coat Coating | Ultraviolet Curable Acrylate Resin | Type | UNIDIC 17-824-9 | UNIDIC 17-824-9 | UNIDIC 17-824-9 |
|  |  | Amount (g) | 13 | 13 | 13 |
|  |  | Concentration (%) | 77 | 77 | 77 |
|  |  | Effective Amount | 10 | 10 | 10 |
|  | Thermoplastic Polyester Resin | Type | VYLON 200 | VYLON 200 | VYLON 200 |
|  |  | Tg (C. °) | 67 | 67 | 67 |
|  |  | Amount (g) | 3 | 5 | 0 |
|  | First Microparticle | Type | PL-2L-MEK | PL-2L-MEK | PL-2L-MEK |
|  |  | Particle Diameter (nm) | 20 | 20 | 20 |
|  |  | Amount (g) | 75 | 75 | 75 |
|  |  | Concentration (%) | 20 | 20 | 20 |
|  |  | Effective Amount | 15 | 15 | 15 |
|  | Second Microparticle | Type | EPOSTAR S6 | EPOSTAR S6 | EPOSTAR S6 |
|  |  | Particle Diameter (μm) | 0.3-0.6 | 0.3-0.6 | 0.3-0.6 |
|  |  | Amount (g) | 0.3 | 0.3 | 0.3 |
|  | Fluorine Compound | Type | OPTOOL | OPTOOL | OPTOOL |
|  |  | Amount (g) | 0.1 | 0.1 | 0.1 |
|  |  | Concentration (%) | 20 | 20 | 20 |
|  |  | Effective Amount | 0.02 | 0.02 | 0.02 |
|  | Solvent | Type | Methyl Ethyl Ketone | Methyl Ethyl Ketone | Methyl Ethyl Ketone |
|  |  | Amount (g) | 18 | 24 | 9.5 |
| Physical Properties Evaluation | Damage Resistance |  | ○ | Δ | ○ |
|  | Pencil Hardness |  | 3H | 3H | 4H |
|  | Adhesiveness |  | ○ | ○ | x |
|  | Stain-Proof Property |  | ○ | ○ | ○ |
|  | Transparency (unevenness) |  | ○ | ○ | ○ |
|  | Conveyance | Adhesiveness | ○ | ○ | x |
|  | Durability | Damage Resistance | ○ | ○ | ○ |

TABLE 1-3

|  |  |  | Example 8 | Example 9 | Comparative Example 3 |
|---|---|---|---|---|---|
| Hard Coat Coating | Ultraviolet Curable Acrylate Resin | Type | UNIDIC 17-824-9 | UNIDIC 17-824-9 | UNIDIC 17-824-9 |
|  |  | Amount (g) | 13 | 13 | 13 |
|  |  | Concentration (%) | 77 | 77 | 77 |
|  |  | Effective Amount | 10 | 10 | 10 |
|  | Thermoplastic Polyester Resin | Type | VYLON 200 | VYLON 200 | VYLON 200 |
|  |  | Tg (C. °) | 67 | 67 | 67 |
|  |  | Amount (g) | 1 | 1 | 1 |
|  | First Microparticle | Type | PL-2L-MEK | PL-2L-MEK | PL-2L-MEK |
|  |  | Particle Diameter (nm) | 20 | 20 | 20 |
|  |  | Amount (g) | 150 | 30 | 0 |
|  |  | Concentration (%) | 20 | 20 | 20 |
|  |  | Effective Amount | 30 | 6 | 0 |
|  | Second Microparticle | Type | EPOSTAR S6 | EPOSTAR S6 | EPOSTAR S6 |
|  |  | Particle Diameter (μm) | 0.3-0.6 | 0.3-0.6 | 0.3-0.6 |
|  |  | Amount (g) | 0.3 | 0.3 | 0.3 |
|  | Fluorine Compound | Type | OPTOOL | OPTOOL | OPTOOL |
|  |  | Amount (g) | 0.1 | 0.1 | 0.1 |
|  |  | Concentration (%) | 20 | 20 | 20 |
|  |  | Effective Amount | 0.02 | 0.02 | 0.02 |
|  | Solvent | Type | Methyl Ethyl Ketone | Methyl Ethyl Ketone | Methyl Ethyl Ketone |
|  |  | Amount (g) | 0 | 21 | 27 |
| Physical Properties Evaluation | Damage Resistance |  | ○ | ○ | x |
|  | Pencil Hardness |  | 4H | 4H | 3H |
|  | Adhesiveness |  | ○ | ○ | ○ |
|  | Stain-Proof Property |  | ○ | ○ | ○ |
|  | Transparency (unevenness) |  | ○ | ○ | ○ |
|  | Conveyance Durability | Adhesiveness | ○ | ○ | ○ |
|  |  | Damage Resistance | ○ | ○ | x |

TABLE 1-4

|  |  |  | Example 10 | Example 11 | Example 12 |
|---|---|---|---|---|---|
| Hard Coat Coating | Ultraviolet Curable Acrylate Resin | Type | UNIDIC 17-824-9 | UNIDIC 17-824-9 | UNIDIC 17-824-9 |
|  |  | Amount (g) | 13 | 13 | 13 |
|  |  | Concentration (%) | 77 | 77 | 77 |
|  |  | Effective Amount | 10 | 10 | 10 |
|  | Thermoplastic Polyester Resin | Type | VYLON GK360 | Polyester TP220 | Polyester LP035 |
|  |  | Tg (C. °) | 56 | 70 | 20 |
|  |  | Amount (g) | 1 | 1 | 1 |
|  | First Microparticle | Type | PL-2L-MEK | PL-2L-MEK | PL-2L-MEK |
|  |  | Particle Diameter (nm) | 20 | 20 | 20 |
|  |  | Amount (g) | 75 | 75 | 75 |
|  |  | Concentration (%) | 20 | 20 | 20 |
|  |  | Effective Amount | 15 | 15 | 15 |
|  | Second Microparticle | Type | EPOSTAR S6 | EPOSTAR S6 | EPOSTAR S6 |
|  |  | Particle Diameter (μm) | 0.3-0.6 | 0.3-0.6 | 0.3-0.6 |
|  |  | Amount (g) | 0.3 | 0.3 | 0.3 |
|  | Fluorine Compound | Type | OPTOOL | OPTOOL | OPTOOL |
|  |  | Amount (g) | 0.1 | 0.1 | 0.1 |
|  |  | Concentration (%) | 20 | 20 | 20 |
|  |  | Effective Amount | 0.02 | 0.02 | 0.02 |
|  | Solvent | Type | Methyl Ethyl Ketone | Methyl Ethyl Ketone | Methyl Ethyl Ketone |
|  |  | Amount (g) | 0 | 0 | 0 |

TABLE 1-4-continued

|  |  | Example 10 | Example 11 | Example 12 |
|---|---|---|---|---|
| Physical Properties Evaluation | Damage Resistance | ○ | ○ | ○ |
|  | Pencil Hardness | 4H | 4H | 4H |
|  | Adhesiveness | ○ | ○ | Δ |
|  | Stain-Proof Property | ○ | ○ | ○ |
|  | Transparency (unevenness) | ○ | ○ | ○ |
|  | Conveyance Durability   Adhesiveness | ○ | ○ | Δ |
|  | Conveyance Durability   Damage Resistance | ○ | ○ | ○ |

TABLE 1-5

|  |  |  | Example 1 | Example 13 |
|---|---|---|---|---|
| Hard Coat Coating | Ultraviolet Curable Acrylate Resin | Type | UNIDIC 17-824-9 | UNIDIC 17-824-9 |
|  |  | Amount (g) | 13 | 13 |
|  |  | Concentration (%) | 77 | 77 |
|  |  | Effective Amount | 10 | 10 |
|  | Thermoplastic Polyester Resin | Type | VYLON 200 | VYLON 200 |
|  |  | Tg (C. °) | 67 | 67 |
|  |  | Amount (g) | 1 | 1 |
|  | First Microparticle | Type | PL-2L-MEK | PL-2L-MEK |
|  |  | Particle Diameter (nm) | 20 | 20 |
|  |  | Amount (g) | 75 | 75 |
|  |  | Concentration (%) | 20 | 20 |
|  |  | Effective Amount | 15 | 15 |
|  | Second Microparticle | Type | EPOSTAR S6 | EPOSTAR S6 |
|  |  | Particle Diameter (μm) | 0.3-0.6 | 0.3-0.6 |
|  |  | Amount (g) | 0.3 | 0 |
|  | Fluorine Compound | Type | OPTOOL | OPTOOL |
|  |  | Amount (g) | 0.1 | 0 |
|  |  | Concentration (%) | 20 | 20 |
|  |  | Effective Amount | 0.02 | 0 |
|  | Solvent | Type | Methyl Ethyl Ketone | Methyl Ethyl Ketone |
|  |  | Amount (g) | 12 | 15 |
| Physical Properties Evaluation | Damage Resistance |  | ○ | ○ |
|  | Pencil Hardness |  | 4H | 4H |
|  | Adhesiveness |  | ○ | ○ |
|  | Stain-Proof Property |  | ○ | Δ |
|  | Transparency (unevenness) |  | ○ | Δ |
|  | Conveyance Durability   Adhesiveness |  | ○ | ○ |
|  | Conveyance Durability   Damage Resistance |  | ○ | ○ |

Even after carrying out the repetitive conveyance operation in a general radiation image conversion device, it is clear that the radiation image conversion panel according to an embodiment of the present invention hardly causes exfoliation and the like of the hard coat layer, and is hardly damaged.

According to an embodiment of the present invention, while maintaining its high scratch resistance, it is possible to prevent a hard coat layer from coming off a transparent base material with respect to a strong repetitive sliding and an impact due to minute inorganic materials such as sand. Further, it is possible to produce a hard coat film with a thin transparent base material by improving adhesiveness of the transparent base material to the hard coat layer, and by minimizing shrinkage when an acrylic resin cures.

According to an embodiment of the present invention, there is provided a radiation image conversion panel having a high damage-proof property and a high stain-proof property without causing deterioration in the quality of an image. The radiation image conversion panel herein is capable of enduring repetitive use even in a severe environment.

Although the present invention has been described and illustrated in detail, it is clearly understood that the same is by way of illustration and example only and is not to be taken by way of limitation, the scope of the present invention being interpreted by terms of the appended claims.

What is claimed is:

1. A hard coat film comprising:
   a transparent base material; and
   a hard coat layer formed on the transparent base material, wherein the hard coat layer includes a cured product obtained by curing a composition comprising:
      an ultraviolet curable acrylate resin including one or more types of multifunctional acrylate;
      first microparticles having an average particle diameter of 5 nm or more and 100 nm or less; and
      a thermoplastic polyester resin.

2. The hard coat film according to claim 1,
wherein the composition includes the thermoplastic polyester resin at a ratio of 1 to 50 parts by weight with respect to 100 parts by weight of the ultraviolet curable acrylate resin.

3. A radiation image conversion panel comprising, while laminating in the order mentioned:
   a supporter;
   a phosphor layer; and
   a protective layer including the hard coat film according to claim 2.

4. The radiation image conversion panel according to claim 3,
   wherein a side surface of the phosphor layer is coated with a resin.

5. The hard coat film according to claim 1,
   wherein the composition includes the first microparticles at a ratio of 40 to 300 parts by weight with respect to 100 parts by weight of the ultraviolet curable acrylate resin.

6. The hard coat film according to claim 5,
   wherein the composition further comprises second microparticles having an average particle diameter of 0.3 μm or more and 1 μm or less.

7. A radiation image conversion panel comprising, while laminating in the order mentioned:
   a supporter;
   a phosphor layer; and
   a protective layer including the hard coat film according to claim 6.

8. The radiation image conversion panel according to claim 7,
   wherein a side surface of the phosphor layer is coated with a resin.

9. A radiation image conversion panel comprising, while laminating in the order mentioned:
   a supporter;
   a phosphor layer; and
   a protective layer including the hard coat film according to claim 5.

10. The radiation image conversion panel according to claim 9,
    wherein a side surface of the phosphor layer is coated with a resin.

11. The hard coat film according to claim 1,
    wherein the thermoplastic polyester resin has a glass-transition temperature (Tg) of 40° C. or higher.

12. A radiation image conversion panel comprising, while laminating in the order mentioned:
    a supporter;
    a phosphor layer; and
    a protective layer including the hard coat film according to claim 11.

13. The radiation image conversion panel according to claim 12,
    wherein a side surface of the phosphor layer is coated with a resin.

14. The hard coat film according to claim 1,
    wherein the composition further comprises a fluorine compound.

15. A radiation image conversion panel comprising, while laminating in the order mentioned:
    a supporter;
    a phosphor layer; and
    a protective layer including the hard coat film according to claim 14.

16. The hard coat film according to claim 1, further comprising an adhesive layer containing matting agent particles, on a surface of the transparent base material opposite to the hard coat layer,
    wherein an average particle diameter M of the matting agent particles and a film thickness d of the adhesive layer satisfy the relation of M>d.

17. A radiation image conversion panel comprising, while laminating in the order mentioned:
    a supporter;
    a phosphor layer; and
    a protective layer including the hard coat film according to claim 16.

18. A radiation image conversion panel comprising, while laminating in the order mentioned:
    a supporter;
    a phosphor layer; and
    a protective layer including the hard coat film according to claim 1.

19. The radiation image conversion panel according to claim 18,
    wherein a side surface of the phosphor layer is coated with a resin.

* * * * *